Sept. 30, 1952  J. C. GRIESS, JR., ET AL  2,612,470
SELECTIVE ELECTRODEPOSITION OF SILVER
Filed Oct. 26, 1949
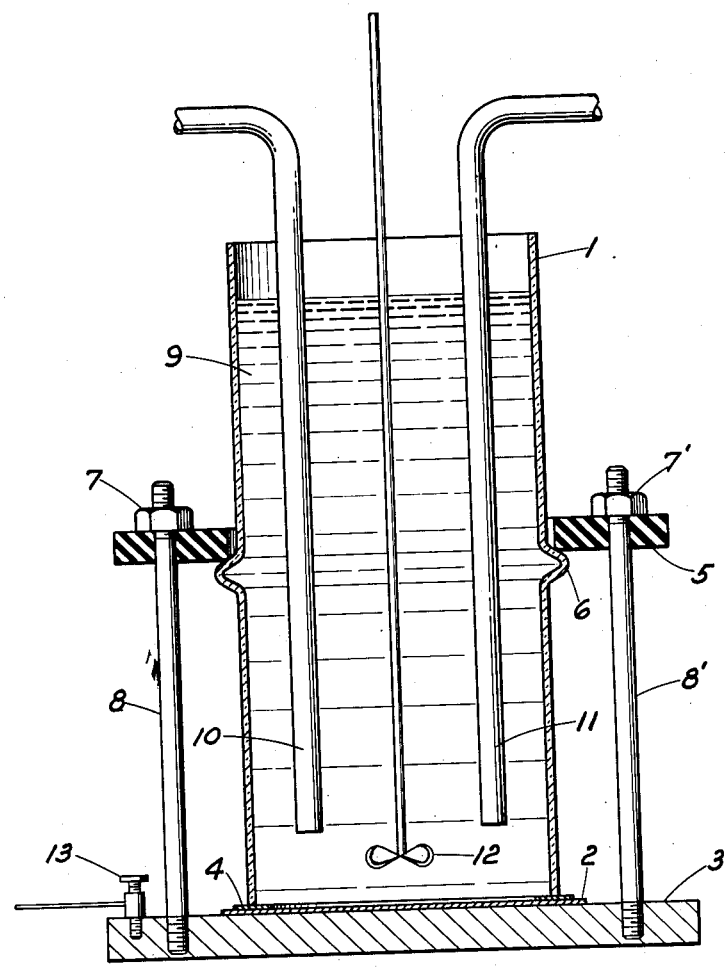
INVENTORS
Lockhart B. Rogers
John C. Griess, Jr.
BY
Roland A. Anderson
ATTORNEY

UNITED STATES PATENT OFFICE 2,612,470

SELECTIVE ELECTRODEPOSITION OF SILVER

John C. Griess, Jr., Oak Ridge, Tenn., and Lockhart B. Rogers, Cambridge, Mass., assignors to the United States of America as represented by the United States Atomic Energy Commission Application October 26, 1949, Serial No. 123,744

13 Claims. (Cl. 204—109)

The present invention relates in general to a process for the electrodeposition of silver from solutions containing the same in microscopic concentrations, and more particularly to the separation of microscopic amounts of silver from macroscopic bulks of palladium by the selective electrodeposition of the silver.

For matter of definition, it is to be understood that the term "trace" as used herein to define concentration in either liquid or solid media, denotes concentrations of less than the order of 5 micrograms per gram of total medium, in accordance with its accepted meaning in the art as defined in Hackh's Chemical Dictionary, 3rd Edition, page 863, published by the Blakiston Company, Philadelphia.

As is known, the radioactive isotope of silver of atomic mass number 111, valuable as a radioactive tracer, is virtually non-existent in nature, but is conventionally prepared by the bombardment of $Pd^{110}$ with slow neutrons in accordance with the following scheme:

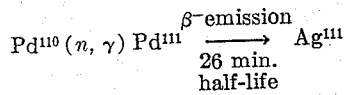

$Ag^{111}$ is a beta-ray emitter having a half-life of 7.5 days, and upon decay transmutes to stable $Cd^{111}$. Production of this isotope is customarily effected by irradiating natural palladium metal (13.5% $Pd^{110}$) in a self-sustaining neutronic nuclear reactor, usually terminating the reaction upon attaining a concentration of $Ag^{111}$ of the order of $10^{-9}$ to $10^{-8}$ of the irradiated mass. Besides producing $Ag^{111}$, irradiation of natural palladium also concomitantly effects pertinent side reaction with $Pd^{108}$ (26.8% in natural Pd) producing radioactive $Pd^{109}$ which thereupon decays into stable $Ag^{109}$ in accordance with the scheme:

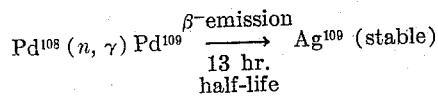

Since $Pd^{108}$ is present in greater amount, and has a greater propensity for undergoing $(n,\gamma)$ reaction, than $Pd^{110}$, the side reaction products are produced in much greater relative quantity than the products of the $Ag^{111}$-producing reaction. For example, the relative amounts of both main and side reaction products obtained by the irradiation of pure metallic palladium in a slow neutron flux are tabulated in the following Table I.

TABLE I

Relative amounts of certain silver and palladium isotopes in mass of neutron-irradiated palladium

[Immediately following irradiation]

| | gm./gm. total Pd mass |
|---|---|
| $Ag^{111}$ | $6.6 \times 10^{-9}$ |
| $Ag^{109}$ | $3.7 \times 10^{-7}$ |
| $Pd^{109}$ | $1.5 \times 10^{-7}$ |

For practical utilization, it is usually required that the produced silver be separately recovered from the irradiated palladium mass. Prior to the present invention, recovery from palladium has been conventionally effected by the selective precipitation of the silver as silver chloride from an acid solution of the irradiated palladium mass, after having added to the solution a quantity of a source of natural silver ions sufficient to exceed the solubility product of silver chloride and to form a precipitate of bulk suitable for removal from the supernatant. The great disadvantage of this process, however, is the necessity for so greatly diluting the produced trace of radio-silver with a macroscopic bulk of inactive silver. For many applications, it is highly desirable that the produced $Ag^{111}$ isotope be associated with as little as possible of other silver isotopes; the necessity for adding the large bulk of inactive silver in the silver chloride precipitation has deleteriously hampered or prohibited many desired tracer applications of $Ag^{111}$. Furthermore, as precipitation processes of this nature are relatively time-consuming, the short half-life of the radioisotope has resulted in the unprofitable decay of much of the tracer during the recovery operations before it has become available for utilization. It has therefore become greatly desired that improved methods be provided for such recovery of trace amounts of silver from macroscopic amounts of palladium, which avoid excessive dilution with other silver isotopes and which may be effected with greater rapidity. Such a method is provided by the present invention.

It is therefore one object of the present invention to provide a new and improved process for the separation and selective recovery of trace amounts of silver from macroscopic bulks of palladium associated therewith.

Another object is to provide such a process which effects a high degree of separation and a high efficiency for silver recovery.

A further object is to provide such a process which may be effected simply and rapidly, and wherein the dilution of the desired macroscopic quantities of silver with additional amounts of silver is minimized.

Still another object is to provide such a process wherein the silver is recovered in metallic form, unassociated with bulks of added foreign substance which might interfere in the various subsequent uses of the recovered silver.

Additional objects will become apparent hereinafter.

Applicants have devised a process for the separation and recovery of trace concentrations of silver from macroscopic bulks of palladium, when in an aqueous medium, which involves the selective cathodic electrodeposition of the silver. More particularly, applicants have discovered that by incorporating stoichiometric excesses of certain agents which form water-soluble complexes with both silver and palladium, including ammonium hydroxide, and the cyanides, thiocyanates, and thiosulfates of sodium and potassium, into aqueous palladium solutions containing trace concentrations of dissolved silver, and maintaining the pH in the alkaline region, certain effects favorable to the electroseparation of silver from the system obtained. Specifically, it was found that by so treating such solutions, the electrodeposition potential on a large platinum cathode for any initial trace concentration of silver down at least to dilutions as low as $10^{-8}$ M was rendered sufficiently separated in the positive direction from that for initial palladium concentrations at least within the range of $10^{-3}$ to 1 M to make selective deposition of silver from the solution distinctly promising. This promise was augmented by the finding that the deposition potentials were relatively well defined, and that the operating cathode potentials for effective silver deposition over the practically operative amperage range did not prohibitively overlap the palladium deposition potential. Upon application to electrolyzing trace silver-macro palladium solutions under the conditions outlined, it was found that the promise was fulfilled; generally, large portions of the silver content were adherently electrodeposited while concomitantly depositing only extremely small proportions of the palladium present.

The propitious electrolytic effects obtained in this way stem from several heretofore-unpredictable factors discovered by the applicants. The first of these factors is that while cathodic silver reduction at these trace concentrations occurs substantially thermodynamically reversibly, that for palladium does not. It is entirely due to this differential reversibility, which results in depression of the palladium deposition potential but not that of silver, that the necessary separation between the electrodeposition potentials obtains. Otherwise, were both metals to deposit reversibly, as could reasonably have been expected in view of the conditions employed, the silver deposition potential would have been more negative than that for palladium, entirely preventing selective electrodeposition of silver. The second factor is that practical electrolytic operation is made possible by the revealed fact that the increase, due to polarization, in cathode negativity beyond the silver electrodeposition potential required to draw electrolytic current within a practical range of amperage is not prohibitively large, despite the microscopic concentrations of silver being dealt with. The third is that the selective silver reduction is practically applicable to the present purpose by virtue of the fact that reduced silver forms a deposit of sufficient adherency, despite its extremely small surface density, to remain affixed to the cathode upon termination of the electrolysis. These discovered effects, which obtain under such difficult circumstances as microscopic concentration of silver and great disparity between silver and palladium concentrations, provide a new and improved trace silver recovery process which comprises the present invention.

It is therefore in accordance with the present invention to separate and selectively recover dissolved silver present in trace concentrations at least as great as $10^{-8}$ molar contained in an aqueous palladium solution having a macroscopic palladium concentration at least as dilute as 1 molar, and preferably within the range of $10^{-3}$ molar to 1 molar, by the method which comprises incorporating in the solution an agent which forms a water-soluble complex with both silver and palladium, chosen from the group of such agents consisting of ammonium hydroxide, and the cyanides, thiocyanates, and thiosulfates of sodium and of potassium, in an amount in excess over the stoichiometric amount required for complex formation with all of the silver and palladium present, thereby solubilizing the silver and palladium content of the solution, thereupon while maintaining alkaline the pH, electrolyzing the solution to effect metal electrodeposition upon a platinum cathode, utilizing an impressed cathode potential at least as positive as the palladium deposition potential, terminating the electrolysis prior to the point where it becomes necessary to impress a cathode potential more negative than the palladium deposition potential to maintain effective metal electrodeposition, thereby effecting selective electrodeposition of silver from the solution, and thereafter recovering the silver-containing cathode deposit.

This method has been found eminently suited for the recovery of trace concentrations of silver associated with palladium bulk in solid media upon first dissolving the media to obtain solutions within the specified concentration ranges. Suitable solution are ordinarily readily prepared from such solid media by simple acid dissolution, followed by neutralization and dilution of the resulting solution. For instance, it has been found that when the medium is a metallic palladium mass, such as the neutron-irradiated palladium occurring in $Ag^{111}$ production, dissolution may be satisfactorily effected by a mixture of hot sulfuric and nitric acids. Since excesses of nitrate ion are generally undesirable in the present process, it is preferred to remove the bulk of nitrate ion from the resulting solution by fuming, prior to neutralizing with sodium or potassium hydroxide. Conventional dissolution procedures of similar simplicity are usually available where the medium is in salt form.

The initial media, either solid or liquid, are normally restricted, of course, to those which contain silver and palladium within the requisite range of concentration ratios to meet the specified solution concentration requirements. However, in instances where the silver to be recovered has an abnormal attribute, such as being radioactive or isotopically enriched, the present process affords a means of recovery even where the silver is in too low a concentration relative to that of palladium to satisfy the specified concentration requirements. To so apply the present process to such recovery, it is merely necessary to add a sufficient microscopic quantity of source of ordinary silver ions to raise the trace silver concentration in the prepared solution to a value greater than $10^{-8}$ M. Then upon electrodeposition, the percentage of the desired abnormal silver recovered is ordinarily in identical proportion to that of the total silver removed from the solution. In this way the applicability of the present invention may be advantageously extended to the selective recovery of extremely minute concentrations of silver having unusual attributes.

Having so provided an initial solution, the process of the present invention is commenced by effecting the complexing step. Regarding the amount of one of said complexing agents to be incorporated in the solution, the amount should first of all be in excess over the stoichiometric amount required for complex formation with all silver and palladium present. The amount of complexant used should also be sufficient to maintain the silver and palladium completely solubilized under the alkaline pH conditions employed during electrolysis. Normally a 0.1 molar excess of complexant is adequate for this purpose for all of the complexants. However, with the alkali thiocyanates it has been found desirable to use greater concentrations, preferably 0.3 molar excess and higher, to mitigate undesirable slow precipitation of trace silver which takes place under the alkaline conditions employed, in spite of the presence of thiocyanate. Furthermore, as is well known in the art, in order that the solution may be effectively electrolyzed it should include sufficient electrolyte to provide a reasonable magnitude of electrolytic conductance. Since the specified complexants are themselves electrolytes of moderate strength, they may be employed to serve also this purpose. Ordinarily a concentration of excess free complexant within the range of 0.1 to 1M provides an operative background electrolyte. Summarizing all of these complexant concentration considerations, the preferable range thereof is from 0.1 to 1 M in excess of the stoichiometric amount required for complex formation. In addition, however, it has been found advantageous that enhanced electrolytic conductivity be obtained in the solution, in the manner customary in the art, by including therein a strong electrolyte, which does not deleteriously interfere with complexing action or electrode reactions, for example sodium or potassium sulfate, the employment of strong electrolyte may be either alternative or complementary to the use of excess complexant for the purpose; concentrations within the range of 0.001 to 1 molar of salts of strong acids and bases have proven eminently satisfactory. When the initial solution has been prepared by dissolving an initial metallic mass by dissolving in sulfuric acid and then neutralizing with sodium or potassium hydroxide, as heretofore described, the resulting concentration of alkali sulfate has proven independently adequate for serving as the background electrolyte.

After thus preparing and complexing the solution, electrolysis is effected in accordance with the present invention. While the present electrolysis operation is not necessarily restricted to any particular electrolytic apparatus, it has been found that certain apparatus features afford enhanced convenience and improved results. For instance, it is particularly beneficial that the platinum cathode have as large a surface area as is practicable. Also, to minimize electrolytic complications introduced by anode reactions and the consequent requisite of the electrolyte demanded by the particular anode used, it is preferred that the silver-containing solution comprise merely the catholyte, and the anode be provided with a separate anolyte operatively linked to the catholyte by means of an ordinary salt bridge, as is done in many instances in the art. In view of the precise control over the absolute cathode potential demanded by the process for effective results, it is highly desirable that a standard reference electrode be included in the cathode system to provide an absolute reference potential with respect to which the cathode potential may be adjusted, in the manner conventional in the analytical electrochemical art. A cathodic half-cell embodying these preferred features and found eminently suited for conducting the present process is diagrammatically illustrated in Fig. 1 of the appending drawing.

Referring to Fig. 1, the illustrated half-cell comprises a catholyte tank formed of a vertical, open, glass cylinder 1, having removably clamped over, and completely covering, its lower open end, a platinum foil cathode 2. The platinum foil cathode 2 is separably backed, and in electrically conductive relationship with, an electrically-conductive base plate 3, and is spaced from the lower rim of the glass cylinder by a substantially electrically - nonconductive ring gasket 4, preferably made from cellulose tape, providing a substantially liquid-tight seal between the cylinder and the cathode. Clamping is effected by a collar 5 drawn firmly down upon a median peripheral ridge 6 on the glass cylinder by the action of nuts 7, 7', on upwardly extending stud bolts 8, 8', attached to the base plate 3. The catholyte tank so formed is adapted to contain a silver-containing solution 9, as the catholyte, into which extend the extremities of salt bridges 10 and 11, leading in the customary manner respectively to an anode half-cell and a reference electrode (neither shown). A stirring means 12 is provided for agitating the solution 9 during electrolysis. The base plate 3 is provided with an electrical terminal 13 for accommodating the cathode lead from a source of electromotive force.

For the anode half-cell, a platinum wire anode operatively extending into an anolyte consisting of a saturated aqueous potassium nitrate solution into which also extends the opposite extremity of the anode salt bridge 10, shown, has proven quite satisfactory for the purpose, although many other conventional anode half-cells, such as a strip of copper immersed in a copper sulfate solution, are also suitable. A conventional saturated calomel electrode has been found to satisfactorily serve as the reference electrode; precise measurement of the cathode potential with respect to this reference has been found best effected by employing a null-point potentiometer connected between the cathode and reference electrode in the customary manner. Further, it has been found best to plug the tips of the salt bridge with gelatinous agar-agar in the usual manner to prevent excessive undesirable influx into the catholyte of salt solutions contained in the bridges. To avoid the difficulties ensuing from the shifting of the deposition potentials and the potential of the reference electrode produced by temperature change, it is desirable that the entire electrolysis system be maintained at a constant temperature, preferably 25° C., throughout each run.

In electrolyzing to effect the desired selective electrodeposition of silver, the cathode potential as measured with respect to the calomel reference electrode, is rendered progressively more negative, by increasing the electromotive force applied between the anode and cathode, until the incipience of silver deposition is noted by the characteristic commencement of electrodeposition current through the electrolyte cell. Electrolysis is then continued, effecting silver deposition, usually accompanied by the concomitant deposition of very small proportions of the palladium present. With apparatus of the type described, the maximum cathode current density produced by silver deposition will normally not be more than of the order of a few microamperes per square centimeter. As silver electrodeposition proceeds with consequent reduction of the silver concentration in the catholyte it is, of course, necessary to progressively reduce, that is, render more negative, the cathode potential to maintain reasonable deposition current through the cell. Therefore, the electrolysis may be effected by maintaining a constant predetermined deposition current in the cell by progressively reducing the cathode potential as becomes necessary, and terminating the electrolysis prior to the cathode's becoming so negative as to reach the electrodeposition potential of palladium in the particular solution employed. More simply and preferably, the electrolysis may be effected by fully reducing, at the outset, the cathode potential below that of the incipience of silver deposition to the predecided termination potential, and maintaining the potential constant at this value throughout the entire electrolysis. For terminating the electrolysis, it is preferred that the catholyte be physically separated from the cathode, while continuing to maintain the cathode at the termination potential. By so doing, deleterious dissolution of the deposit back into the catholyte, which was found to take place if termination is effected by merely opening the cell's external electric circuit, is minimized. For best results, termination should be effected by flushing the palladium solution from the catholyte tank with an aqueous solution of a strong electrolyte which does not form a stable complex with either silver or palladium, for example sodium nitrate or sodium perchlorate. In this manner, the cathode is beneficially cleansed of the silver-palladium solution, while the strong electrolyte provides sufficient conductivity for continued maintenance of the cathode potential. Finally, the wash solution is drained away, leaving the silver in the conveniently-utilizable form of a metallic deposit on a removable platinum foil.

It is evident from the foregoing that the efficacy for present purposes of the electrolysis operation depends upon carefully maintaining the cathode potential in the interval between the deposition of silver and that of palladium. To do this effectively, it is important to know accurately the deposition potentials for both silver and palladium at the outset of the electrolysis. However, the exact values for these deposition potentials and the interval between them vary with the composition of the particular solution being treated; the principal factors on which they depend are the concentrations of these metals, and the particular complexant used and its concentration. Nevertheless, it has been found a simple matter to predetermine these potentials for any particular composition of solution prepared in accordance with the foregoing by a simple manipulation of the electrolyte apparatus at the beginning of the operation. Such manipulation comprises merely quickly obtaining a polarogram of the solution over the pertinent potential range. This is done by gradually increasing the negativity of the cathode potential while noting on a microammeter in the electrolyte cell circuit the magnitude of the current produced. Unless undesirable foreign impurities which will engage in competitive cathodic reaction in the pertinent potential range have been introduced into the solution, the first appreciable upsurge in current manifested is that caused by silver deposition commencing to occur. The silver deposition current rapidly rises with progressive increase in cathode negativity over a short range of potential, finally levelling off at a limiting current which remains substantially constant with further increase in cathode negativity until a sharp, steep, second upsurge in current, above the limiting current for silver, commences. Normally, this second upsurge is indicative of the beginning of major deposition of palladium. In accordance with conventional definition, the point of initiation of the first upsurge is the "silver deposition potential," and that for the second is the "palladium deposition potential." Ordinarily, upon noting the beginning of the second upsurge, the potential should be immediately made less negative and adjusted to within the range between the silver and palladium deposition potentials for effecting the desired selective deposition of silver. If, during this initial polarography manipulation, the palladium deposition potential is consequently slightly exceeded for only a few moments' duration, the additional amount of palladium resultingly deposited will not seriously detract from the efficiency of the silver separation process.

If necessary, though, where the solution contains trace impurities which engage in competitive cathodic reaction within the pertinent potential range, the palladium current upsurge may be distinguished from any minor surges caused by trace impurities during the polarography operation by means of continuing to decrease the cathode potential, whence the palladium current density will characteristically quickly rise far into the milliampere per square centimeter region and higher, far beyond that attributable to a trace impurity. However, if this is done, excessive palladium deposition will consequently occur, normally making it necessary to electrolytically dissolve the entire deposit by operating the half-cell as an anode, employing a potential considerably more positive than the palladium dissolution potential, before effecting cathodic deposition in accordance with the information obtained, or, alternatively, where possible, starting anew with an identical fresh solution and a new platinum foil cathode.

Actually, it is necessary to know only the palladium deposition potential to effectively conduct the present electrolysis-operation. Being that it has been found that silver selectively deposits at a potential at least as positive as the palladium deposition potential under the outlined conditions, satisfactory selective silver electroseparation may be effected by conducting the entire electrolysis with the cathode potential maintained exactly at the palladium deposition potential. Therefore, even if the presence of conflicting trace impurities confuse the determination of the silver deposition potential, the palladium deposition potential may be readily distinguished from them, in the manner discussed, enabling effective operation.

Representative of the quantitative magnitude of the pertinent potentials and the interval between them are the values, empirically determined for operation under the preferred conditions, set forth in Table II below. The values afford a basis for the proper adjustment of the operating cathode potential without effecting an initial polarographic manipulation, when operating under identical conditions, and further may be utilized to obtain a rough estimation of the values of the potentials for operation under different conditions. The presented values are for electrolyses conducted in a cell of the type described, with the catholyte comprising an aqueous solution substantially $10^{-3}$ M in palladium and approximately $10^{-7}$ M in silver containing complexing agent in the amount specified, and of a fractional molarity in sodium sulfate. The pH of the solution was that resulting from completely neutralizing the solution prior to complexant introduction, and then including the complexants in the indicated amounts; the resulting pH was consequently in the alkaline region in all cases. It may be noted in the case of NaCN that NaOH was added to 1.0 M also, for the purpose of further raising the pH.

TABLE II

*Silver and palladium deposition potentials on Pt cathode from aqueous solutions $10^{-3}$ M in Pd and $10^{-7}$ M in Ag.*

| Complexant Concentration | Deposition Potentials (volts)[1] | |
|---|---|---|
|  | Ag | Pd |
| 0.1 M NH₄OH | +0.150 | −0.43 |
| 0.3 M KCNS | +0.01 | −0.21 |
| 0.1 M Na₂S₂O₃ | −0.20 | <−0.76 |
| 0.1 M NaCN+1.0 M NaOH | −1.00 | <−1.21 |

[1] Vs. standard saturated calomel electrode at 25° C.

It may be seen from Table II that under the stated conditions with a silver concentration approximately $10^{-4}$ that of palladium, the interval between the silver and palladium deposition potentials is at least 0.2 volt in each case. Values for the particularly important palladium deposition potential obtaining under circumstances of different palladium concentrations, within the specified range and with the concentrations of complexant stated in Table II, may be roughly estimated by adding to the potential values tabulated in Table II the correction:

$$\frac{0.059}{2} \log \frac{C}{10^{-3}} \text{ (volts)}$$

where C=total palladium concentration in the solution in moles per liter.

The importance of maintaining an alkaline pH in the solution is to suppress the electrolytic hydrogen reduction potential sufficiently to prevent deleterious cathodic hydrogen evolution from occurring during electrolysis. It has been generally found that so long as the pH is maintained above 7, the depression of the hydrogen potential is sufficient that any hydrogen evolution occurring will not seriously detract from selective silver deposition. However, it is preferred, for best results, that the pH be maintained sufficiently high, where possible, that the hydrogen deposition potential is in all instances more negative than the palladium deposition potential. This is particularly important in the event that a polarographic manipulation is to be conducted at the beginning of the electrolysis, in order to avoid confusion of the hydrogen reduction potential for the palladium deposition potential. In any event, however, such confusion may readily be avoided, whatever the pH, since the hydrogen deposition potential may be accurately predetermined by first determining the pH by conventional means, such a pH meter provided with a glass electrode, and calculating the hydrogen reduction potential therefrom by using the relationship:

$$V = 0.453 - 0.0591 \text{ (pH)}$$

where $V$=hydrogen reduction potential (vs. the standard saturated calomel electrode at 25° C.) in volts.

The same relationship may also be employed to calculate the pH necessary to depress the hydrogen reduction potential to a value more negative than the palladium deposition potential.

Further illustration of the quantitative aspects and preferred procedure of the process of this invention is provided in the following specific Example I. In Example I, the present process was applied to the selective recovery of silver for its valuable content of radioactive $Ag^{111}$ from a mass of neutron-irradiated palladium. A series of comparative runs, each of the same duration, were made to assess the relative efficacies of the different complexants and the relative effectiveness of a number of selected operating cathode potentials with each complexant.

EXAMPLE I

A weighed mass of natural palladium metal was subjected to irradiation with a flux of neutrons in a self-sustaining neutronic nuclear reactor, terminating the reaction when the concentrations of produced $Ag^{111}$, $Ag^{109}$, and $Pd^{109}$ reached those tabulated in Table I, supra. The palladium mass was then dissolved in 50 ml. per gram of a 1:10 mixture of hot, concentrated nitric and sulfuric acids. After the bulk of the nitrate ion was then removed by fuming, the excess acid was completely neutralized by adding a solution of sodium hydroxide. From this neutralized solution carefully measured equal portions were taken; to each was added an amount of one of the complexants sufficient that upon accurate volumetric dilution to a palladium concentration of $1 \times 10^{-3}$ molar, the solution contained the stated concentration of complexant. Analysis of the solutions prepared indicated that they mutually contained an approximately $10^{-7}$ molar concentration of silver, apparently resulting from initial trace silver impurities in the starting palladium mass, or the dissolving acids. Each solution in turn was electrolyzed in apparatus substantially identical to that illustrated in the appended drawing. The platinum foil cathode was relatively large with respect to the volume of the solution, having an area equal to 0.5 $V^{\frac{2}{3}}$, where V is the volume of the solution. Each electrolysis was conducted at 25° C. and for 30 minutes duration, and the cathode potential throughout each run was maintained at a constant single value; thereafter removing a large part of the solution by suction, without breaking electrical contact, and then flushing the remainder of the solution from the cell with about 7 volumes of 0.1 M sodium perchlorate. Finally, after flushing the cell with about 3 volumes of distilled water, electrical contact was broken and the cathode was then removed, dried, under an infrared lamp, and radiometrically analyzed for the percentage of total silver deposited, as indicated by the $Ag^{111}$ radiation, and that of total palladium, as indicated by the $Pd^{109}$ radiation. The results obtained and the achieved separation factor $$\left(\text{i. e. } \frac{\text{Percent total Ag deposited}}{\text{Percent total Pd deposited}}\right)$$

are tabulated in Table III below.

TABLE III

*Electrolysis of aqueous solutions $10^{-3}$ in Pd and $10^{-7}$ in Ag*

| Complexant | Cathode Potential (Volts)[1] | Percent Ag Plated | Percent Pd Plated | Separation Factor |
|---|---|---|---|---|
| 0.1 M $Na_2S_2O_3$ | −0.250 | 4.3 | 0.016 | 270 |
| | −0.410 | 12 | 0.018 | 670 |
| | −0.500 | 22 | 0.086 | 260 |
| 0.1 M $NH_4OH$ | +0.150 | 8.4 | 0.008 | 1,000 |
| | −0.015 | 21 | 0.017 | 1,200 |
| 0.3 M KCNS | −0.350 | 47 | 0.14 | 340 |
| | −0.100 | 16 | 0.069 | 230 |
| | −0.220 | 27 | 0.15 | 180 |
| | −0.350 | 44 | 0.80 | 55 |
| (0.1 M NaCN) (1.0 M NaOH) | −0.805 | 0.35 | 0.008 | 40 |
| | −0.860 | 0.33 | 0.004 | 80 |
| | −0.950 | 0.40 | 0.008 | 50 |
| | −1.025 | 1.7 | 0.005 | 390 |
| | −1.210 | 25 | 0.006 | 4,200 |

[1] Vs. standard saturated calomel electrode at 25° C.

In Table III, the high degree of separation achieved by the present process is evidenced by the high separation factors obtained, with some being of the order of $10^3$. It may be noted that sodium cyanide has demonstrated superiority over the other complexants, by affording by far the highest separation factor. Upon radiometrically assaying the surfaces of the catholyte container, the agar-agar tips of the salt bridges, and the gasket of the apparatus used, it was found that in all cases sorption losses, often troublesome in handling trace materials, of silver and palladium were negligible. However, the need for employing reagents and reactants as pure of trace silver contamination as possible boldly appeared.

While only minor amounts of the total silver content were recovered in Example I by the runs of arbitrarily restricted duration, it is in most cases possible to recover substantially all of the silver without marked decrease in the observed separation factors by increasing the duration of electrolysis. In addition, complete dissolution of the deposit in fresh catholyte followed by a second selective silver electrodeposition results in a corresponding increase in purity of the deposit. Thus, by application of repeated electrolyses, virtually any degree of decontamination from palladium desired may be obtained. The following Example II is illustrative of the efficacy of such repeated electrolysis.

EXAMPLE II

Three equal portions of the solution prepared and complexed with 0.1 M NaCN + 1.0 M NaOH as described in Example I were each electrolyzed in the same manner, but for a longer duration of 3 hours. After washing the deposits as before, they were radiometrically analyzed for silver and palladium. Then the deposited cathodes were contacted with a second catholyte identical in composition with the first, but initially containing substantially no silver or palladium. The deposit was then completely anodically dissolved in the catholyte by maintaining the cathode at a potential of +1.0 volt for 10 minutes. Thereafter, the potential was dropped to −1.210 volts and maintained at that point for 3 hours for effecting the second selective silver electrodeposition. The resulting deposit was washed as before, and radiometrically analysed. The results are tabulated in Table IV below.

TABLE IV

*Repeated electrolyses*

Complexant: 0.1 M NaCN + 1.0 M NaOH
Duration: 1st deposition: 3 hours; 2nd deposition: 3 hours.

| Run | Percent Catholyte Metal Content Deposited | | | | Total Recovery (percent) | | Separation Factor |
|---|---|---|---|---|---|---|---|
| | First Electrolysis | | Second Electrolysis | | | | |
| | Ag | Pd | Ag | Pd | Ag | Pd | |
| 1 | 89 | ~0.09 | 88 | ~0.09 | 79 | ~$8 \times 10^{-5}$ | $10^4$ |
| 2 | 88 | ~0.09 | 88 | ~0.09 | 78 | ~$8 \times 10^{-5}$ | $10^5$ |
| 3 | 87 | ~0.09 | 87 | ~0.09 | 76 | ~$8 \times 10^{-5}$ | $10^3$ |

Thus the silver finally obtained was contaminated with not more than about 1% palladium impurity. A third electrolysis should produce a correspondingly purer deposit of silver. From the results of Example II it may be seen that the present process is capable not only of recovering trace silver with high efficiency, but it further, through repetition, can recover it in virtually any degree of decontamination from palladium desired.

While the important application of the present process to the recovery of radioisotopes of silver, particularly $Ag^{111}$, has been emphasized herein, the process is of much wider application. For example, it may advantageously be applied to the removal of trace silver contamination from reagent palladium compounds. Other applications will become apparent to those skilled in the art. Accordingly, it is to be understood that all matters contained in the above description and examples shall be interpreted as illustrative and not limitative of the scope of this invention as it is intended to claim the present invention as broadly as possible in view of the prior art.

What is claimed is:

1. A method for the separation and selective recovery of dissolved silver present in trace concentrations at least as great as $10^{-8}$ molar from an aqueous palladium solution containing the same and having a macroscopic palladium concentration within the approximate range of $10^{-3}$ to 1 molar, which comprises incorporating into said solution an agent which forms water-soluble complexes with both silver and palladium chosen from the group of such agents consisting of ammonium hydroxide, and the cyanides, thiocyanates, and thiosulfates of sodium and of potassium, in an amount in excess over the stoichiometric amount required for soluble complex formation with all of the silver and palladium present, to thereby solubly complex the silver and palladium content of the solution, and thereupon, while maintaining the pH alkaline, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution.

2. A method for the separation and selective recovery of dissolved silver present in trace concentration within the approximate range of $5 \times 10^{-5}$ molar to $10^{-8}$ molar from an aqueous palladium solution containing the same and having a macroscopic palladium concentration at least as dilute as 1 molar, which comprises incorporating into said solution an agent which forms water-soluble complexes with both silver and palladium, chosen from the group of such agents consisting of ammonium hydroxide, and the cyanides, thiocyanates, and thiosulfates of sodium and of potassium, in an amount in an excess of approximately 0.1 to 1 molar over the stoichiometric amount required for soluble complex formation with all of the silver and palladium present, thereby solubly complexing the silver and palladium content of the solution, and thereupon, while maintaining alkaline the pH, electrolyzing the resulting solution to effect metal electrodeposition upon a platinum cathode, while restricting the cathode potentials impressed therefor to those at least as positive as that demarcating the cathodic palladium deposition potential of the resulting system, thereby effecting selective electrodeposition of silver from the solution.

3. A method for the separation and selective recovery of dissolved silver present in trace concentration at least as great as $10^{-8}$ molar from an aqueous palladium solution containing the same and having a macroscopic palladium concentration within the approximate range of $10^{-3}$ molar to 1 molar, which comprises incorporating into said solution an agent which forms water-soluble complexes with both silver and palladium, chosen from the group of such agents consisting of ammonium hydroxide, and the cyanides, thiocyanates, and thiosulfates of sodium and potassium, in an amount in excess over the stoichiometric amount required for soluble complex formation with all of the silver and palladium present, thereby solubly complexing the silver and palladium content of the solution and rendering the deposition potential on a platinum cathode for silver more positive than that for palladium, thereupon, while maintaining alkaline the pH, electrolyzing the resulting solution to effect metal electrodeposition upon a platinum cathode by maintaining the cathode potential impressed therefor between the silver deposition and that demarcating the cathodic palladium deposition potential of the resulting system, thereby effecting selective electrodeposition of silver from the solution.

4. A method for the separation and selective recovery of dissolved silver present in trace concentration of substantially $10^{-7}$ molar from an aqueous, substantially $10^{-3}$ molar palladium solution containing the same, which comprises incorporating into said solution an agent which forms water-soluble complexes with both silver and palladium chosen from the group of such agents consisting of ammonium hydroxide, and the cyanides, thiocyanates, and thiosulfates of sodium and of potassium, in an amount in an excess of substantially 0.1 to 1 molar over the stoichiometric amount required for soluble complex formation with all of the silver and palladium present, also establishing in said solution a concentration within the range of 0.001 to 1 molar of sodium sulfate, thereupon, while maintaining the pH alkaline, electrolyzing the resulting solution to effect metal electrodeposition upon a platinum cathode having an area of the order of relative magnitude:

$$A = 0.5 \, V^{2/3}$$

(wherein $A$=area of cathode; $V$=volume of solution in same units) while restricting the cathode potentials impressed therefor to those at least as positive as that demarcating the cathodic palladium deposition potential of the resulting system, thereby effecting selective electrodeposition of silver from the solution, and thereafter recovering the silver-containing cathode deposit.

5. A method for the separation and selective recovery of dissolved silver present in trace concentration from an aqueous palladium solution containing the same and having a macroscopic palladium concentration within the approximate range of $10^{-3}$ to 1 molar which comprises adding to said solution an amount of a source of silver ions sufficient to provide therein a trace concentration of total silver present at least as great as $10^{-8}$ molar, then incorporating into said solution an agent which forms water-soluble complexes with both silver and palladium chosen from the group of such agents consisting of ammonium hydroxide, and the cyanides, thiocyanates, and thiosulfates of sodium and of potassium, in an amount in excess over the stoichiometric amount required for soluble complex formation with all of the silver and palladium present, to thereby solubly complex the silver and palladium content of the solution, and thereupon, while maintaining alkaline the pH, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution.

6. A method for the separation and selective recovery of silver present in trace concentrations from a macroscopic mass of metallic palladium containing the same, which comprises preparing an aqueous solution thereupon having a palladium concentration within the approximate range of $10^{-3}$ to 1 molar by means of acid dissolution of said palladium mass and subsequent aqueous dilution, then adding to said solution an amount of a source of silver ions sufficient to provide therein a trace concentration of total silver present at least as great as $10^{-8}$ molar, thereupon incorporating into said solution an agent which forms water-soluble complexes with both silver and palladium chosen from the group of such agents consisting of ammonium hydroxide, and the cyanides, thiocyanates, and thiosulfates of sodium and of potassium, in an amount in excess over the stoichiometric amount required for soluble complex formation with all of the silver and palladium present, to thereby solubly complex the silver and palladium content of the solution, and thereafter, while maintaining alkaline the pH, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution, and finally recovering the consequent silver-containing cathode deposit.

7. In the production of the radioisotope of silver of mass number 111 by means of neutron irradiation of metallic palladium to produce trace concentrations of silver isotopes therein, including $Ag^{111}$, by transmutation, the improved method for the separation and selective recovery from an irradiated palladium mass of silver so produced, which comprises dissolving said palladium mass in a hot mixture of nitric and sulfuric acids, heating to expell by fuming the bulk of the nitrate anions present, neutralizing the resulting solution with an alkali hydroxide, diluting the neutralized solution to adjust the palladium concentration to within the approximate range of $10^{-3}$ to 1 molar, then adding to said solution an amount of a source of silver ions sufficient to provide therein a trace concentration of total silver present at least as great as $10^{-8}$ molar, thereupon incorporating into said neutralized solution an agent which forms water-soluble complexes with both silver and palladium chosen from the group of such agents consisting of ammonium hydroxide, and the cyanides, thiocyanates, and thiosulfates of sodium and of potassium, in an amount in an excess of approximately 0.1 to 1 molar over the stoichiometric amount required for soluble complex formation with all of the silver and palladium present, thereby solubly complexing the silver and palladium content of the solution, thereupon, under the consequent condition of alkaline pH, electrolyzing the resulting solution to effect metal electrodeposition upon a platinum cathode while restricting the cathode deposition potentials impressed therefor to those at least as positive as that demarcating the cathodic palladium deposition potential of the resulting system, thereby effecting selective electrodeposition of silver from the solution, and finally recovering the consequent $Ag^{111}$-containing cathode deposit.

8. A method for the separation and selective recovery of dissolved silver present in trace concentration at least as great as $10^{-8}$ molar from an aqueous palladium solution containing the same and having a macroscopic palladium concentration within the approximate range of $10^{-3}$ to 1 molar, which comprises incorporating into said solution sodium cyanide in an excess of approximately 0.1 to 1 molar over the stoichiometric amount required for soluble complex formation with all of the silver and palladium present, and thereupon, while maintaining alkaline the pH, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution.

9. A method for the separation and selective recovery of dissolved silver present in trace concentration at least as great as $10^{-8}$ molar from an aqueous palladium solution containing the same and having a macroscopic palladium concentration within the approximate range of $10^{-3}$ to 1 molar, which comprises incorporating into said solution ammonium hydroxide in an excess of approximately 0.1 to 1 molar over the stoichiometric amount required for soluble complex formation with all of the silver and palladium present, and thereupon, while maintaining alkaline the pH, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution.

10. A method for the separation and selective recovery of dissolved silver present in trace concentration at least as great as $10^{-8}$ molar from an aqueous palladium solution containing the same and having a macroscopic palladium concentration within the approximate range of $10^{-3}$ to 1 molar, which comprises incorporating into the solution sodium thiosulfate in an excess of approximately 0.1 to 1 molar over the stoichiometric amount required for soluble complex formation with all of the silver and palladium present, and thereupon, while maintaining alkaline the pH, electrolyzing the resulting solution to effect metal electrodeposition upon a platinum cathode while restricting the cathode potentials impressed therefor to those at least as positive as that demarcating the cathodic palladium deposition potential of the resulting system, thereby effecting selective electrodeposition of silver from the solution.

11. A method for the separation and selective recovery of dissolved silver present in trace concentration at least as great as $10^{-8}$ molar from an aqueous palladium solution of neutral pH containing the same and having a macroscopic palladium concentration of substantially $10^{-3}$ molar, which comprises incorporating into said solution a substantially 0.1 molar sodium cyanide concentration and a substantially 1.0 molar sodium hydroxide concentration, and thereupon electrolyzing the resulting solution to effect metal electrodeposition upon a platinum cathode at a constant cathode potential impressed therefor of substantially $-1.21$ volts (vs. standard saturated calomel electrode at 25° C.), thereby effecting selective electrodeposition of silver from the solution.

12. A method for the separation and selective recovery of dissolved silver present in trace concentration at least as great as $10^{-8}$ molar from an aqueous palladium solution containing the same and having a macroscopic palladium concentration within the approximate range of $10^{-3}$ molar to 1 molar, which comprises incorporating into said solution an agent which forms water-soluble complexes with both silver and palladium, chosen from the group of such agents consisting of ammonium hydroxide, and the cyanides, thiocyanates, and thiosulfates of sodium and of potassium, in an amount in an excess of 0.1 to 1 molar over the amount required for soluble complex formation with all of the silver and palladium present, thereupon, while maintaining alkaline the pH, electrolyzing the resulting solution to effect metal electrodeposition upon a platinum cathode while restricting the cathode deposition potentials impressed therefor to those at least as positive as that demarcating the cathodic palladium deposition potential of the resulting system, thereby effecting selective electrodeposition of silver from the solution, then separating the deposit-bearing cathode from said solution and operatively disposing it as an electrode in a second aqueous solution containing substantially the same concentration of the same complexant chosen from the aforesaid group as previously incorporated into the initial solution, then electrolyzing said second solution with the platinum electrode bearing said deposit serving as the anode to anodically dissolve the deposit from said electrode, thereby providing a trace silver concentration of at least as great as $10^{-8}$ molar in said second solution, and thereupon, while maintaining alkaline the pH, electrolyzing the resulting solution to effect metal electrodeposition upon a platinum cathode while employing substantially the same cathode potential impressed therefor as in the first electrodeposition step, thereby effecting selective electrodeposition from said second solution of silver less contaminated with palladium than that in the first said deposit.

13. A method for the separation and selective recovery of dissolved silver present in a trace concentration at least as great as $10^{-8}$ molar from an aqueous palladium solution of neutral pH containing the same and having a macroscopic palladium concentration of substantially $10^{-3}$ molar, which comprises incorporating into the solution a substantially 0.1 molar sodium cyanide concentration and a substantially 1.0 molar sodium hydroxide concentration, thereupon electrolyzing the resulting solution to effect metal deposition upon a platinum cathode at a constant cathode potential impressed therefor of substantially −1.21 volts (vs. standard saturated calomel electrode at 25° C.), thereby effecting selective electrodeposition of silver from the solution, then separating the deposit-bearing cathode from said solution and operatively disposing it as an electrode in a second aqueous solution substantially 0.1 molar in sodium cyanide and 1.0 molar in sodium hydroxide, then electrolyzing said second solution with the platinum electrode bearing said deposit serving as the anode to anodically dissolve the deposit from said electrode, thereby providing a trace silver concentration of at least or great as $10^{-8}$ molar in said second solution, thereupon, electrolyzing the resulting solution to effect metal deposition upon a platinum cathode at a constant cathode potential impressed therefor of substantially −1.21 volts (vs. standard saturated calomel electrode at 25° C.), thereby effecting selective electrodeposition from said second solution of silver less contaminated with palladium than that in the first said deposit, and finally recovering the resulting silver-containing cathode deposit.

JOHN C. GRIESS, JR.
LOCKHART B. ROGERS.

REFERENCES CITED

The following references are of record in the file of this patent:

Glasstone: An Introduction to Electrochemistry (1942), pp. 436–37, 489–90.

Lindsay: The Analyst, vol. 73 (1948), pp. 67–73.

Okac: Zeitschrift für Analytische Chemie, vol. 89 (1932), pp. 106–108.

Hickling: Transactions of the Faraday Society, vol. 38 (1942), pp. 29–32.

Faust: Transactions of the Electrochemical Society, vol. 78 (1940), pp. 398–9.